United States Patent [19]

Doll

[11] 4,121,278
[45] Oct. 17, 1978

[54] MOTORCYCLE HEADLIGHT TILT CONTROL

[75] Inventor: Ronald L. Doll, Santa Monica, Calif.

[73] Assignee: Spirit of America, Inc., Gardena, Calif.

[21] Appl. No.: 784,034

[22] Filed: Apr. 4, 1977

[51] Int. Cl.² .............................................. B62J 5/00
[52] U.S. Cl. .................................... 362/72; 296/78.1; 362/39; 362/428
[58] Field of Search ....................... 362/72, 39, 40, 53, 362/427, 428; 296/78.1

[56] References Cited

U.S. PATENT DOCUMENTS

| 3,686,497 | 8/1972 | Salvo | 362/428 |
| 3,922,031 | 11/1975 | Hugon | 362/72 |
| 4,019,774 | 4/1977 | Tsukahara | 296/78.1 |

FOREIGN PATENT DOCUMENTS

| 308,728 | 7/1955 | Switzerland | 362/72 |
| 733,008 | 7/1955 | United Kingdom | 362/72 |

Primary Examiner—Samuel W. Engle
Assistant Examiner—Donald P. Walsh
Attorney, Agent, or Firm—William W. Haefliger

[57] ABSTRACT

A motorcycle headlight tilt control cooperates with wind deflecting fairing. It includes:
(a) support means supporting the headlight structure to the fairing so that the headlight is tiltable to tilt the headlight forward beam up and down,
(b) a manual control on the fairing, and
(c) other means connected with the headlight structure and the manual control to controllably tilt the headlight in response to manual operation of said control,
(d) there being a spring acting to transmit force biasing said headlight structure in a tilt direction.

7 Claims, 8 Drawing Figures

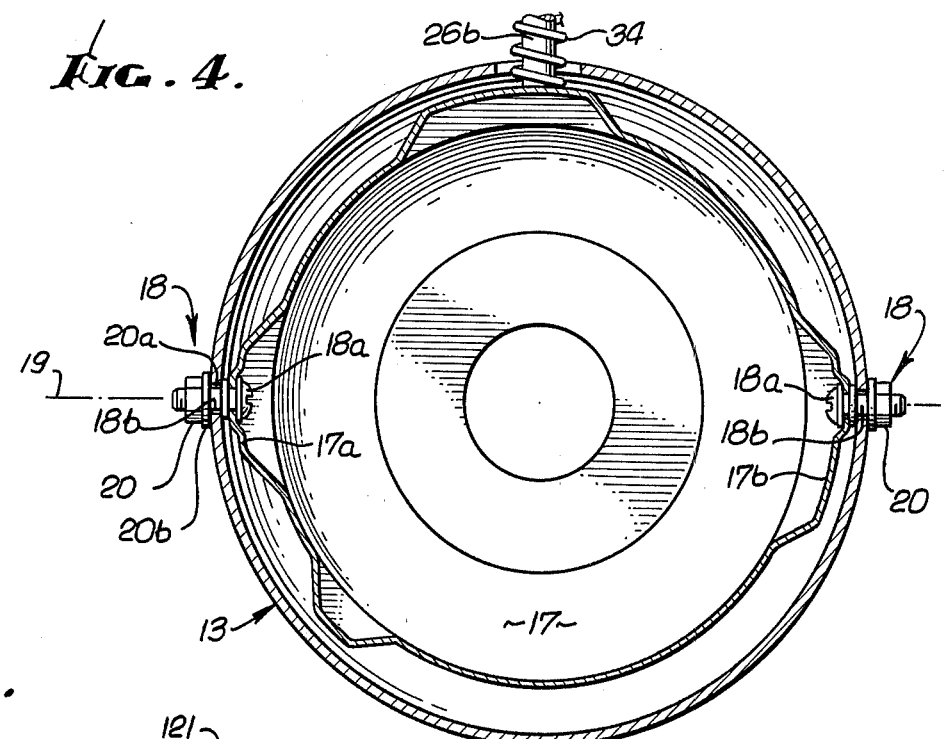
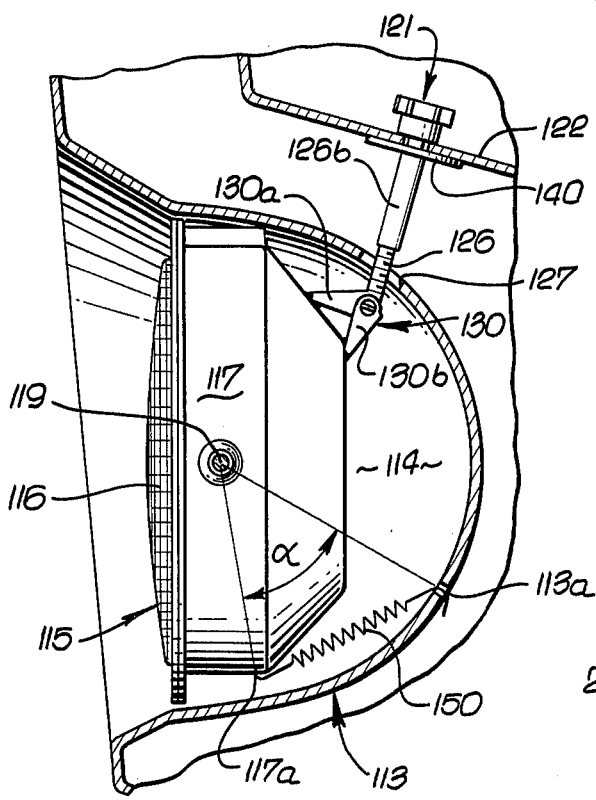
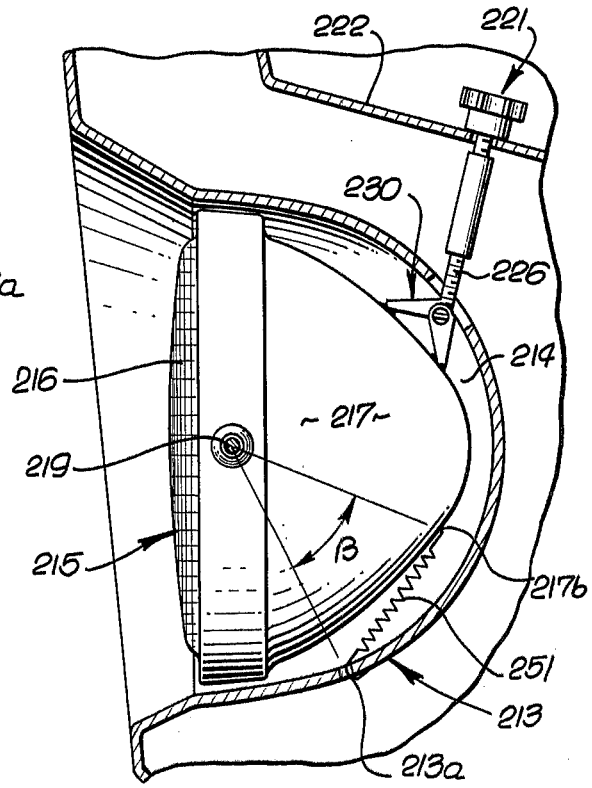
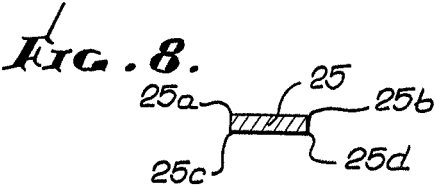

MOTORCYCLE HEADLIGHT TILT CONTROL

BACKGROUND OF THE INVENTION

This invention relates generally to adjustment of motorcycle headlights, and more particularly concerns control of headlight tilt.

The use of fixed position motorcycle headlights frequently results in unwanted tilting of the beam in an upward direction. This can occur when the rider is especially heavy and mounts a motorcycle. In cases where the headlight is mounted to a fairing or wind screen, dislocation of the headlight to produce excessive upward tilting of the beam can occur when the fairing is jarred due to vibration. Past attempts to alleviate this problem have lacked the unusual advantages in structure, mode of operation and results as are now afforded by the simple, effective tilt control which is the subject of the present invention.

SUMMARY OF THE INVENTION

It is a major object of the invention to provide a simple headlight tilt control usable in conjunction with a motorcycle fairing, and which obviates the above problems and difficulties. Basically, it comprises:
 (a) support means supporting the headlight structure to the fairing so that the headlight is tiltable to tilt the headlight forward beam up and down,
 (b) a manual control on the fairing, and
 (c) other means connected with the headlight structure and the manual control to controllably tilt the headlight in response to manual operation of said control.

As will be seen, the referenced other means may advantageously include a first part connected to the lamp casing in offset relation to a lateral axis about which the casing is tiltable relative to the fairing, and a second and elongated part connected to the manual control. The parts may typically have threaded interengagement characterized in that rotation of the second part by the manual control displaces the first part up and down. Further, a biasing spring may be located to extend about the second part, or at another location in the re-entrant portion of the fairing to urge the light casing in a direction to take-up looseness between the first and second parts and the casing, for holding the casing in selected tilt position.

These and other objects and advantages of the invention, as well as the details of an illustrative embodiment, will be more fully understood from the following description and drawings, in which:

DRAWING DESCRIPTION

FIG. 1 is a perspective view of a motorcycle;
FIG. 2 is an enlarged elevation in section on lines 2—2 of FIG. 1;
FIG. 3 is a fragmentary elevation showing a headlight tilt control;
FIG. 4 is an enlarged elevation on lines 4—4 of FIG. 2;
FIG. 5 is a view like FIG. 2 showing a modification;
FIG. 6 is a view like FIG. 2 showing another modification; and
FIG. 7 is a fragmentary elevation on lines 7—7 of FIG. 3.
FIG. 8 shows a trunnion cross section.

DETAILED DESCRIPTION

Figure 1:
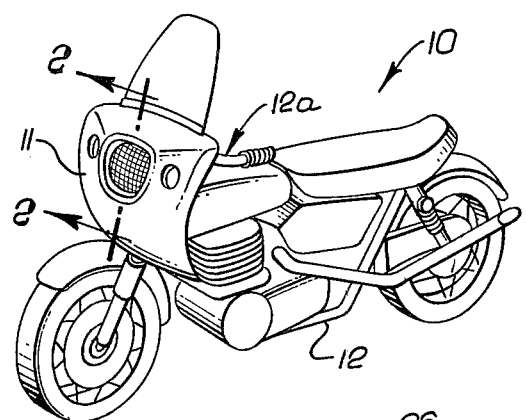
Figure 2:
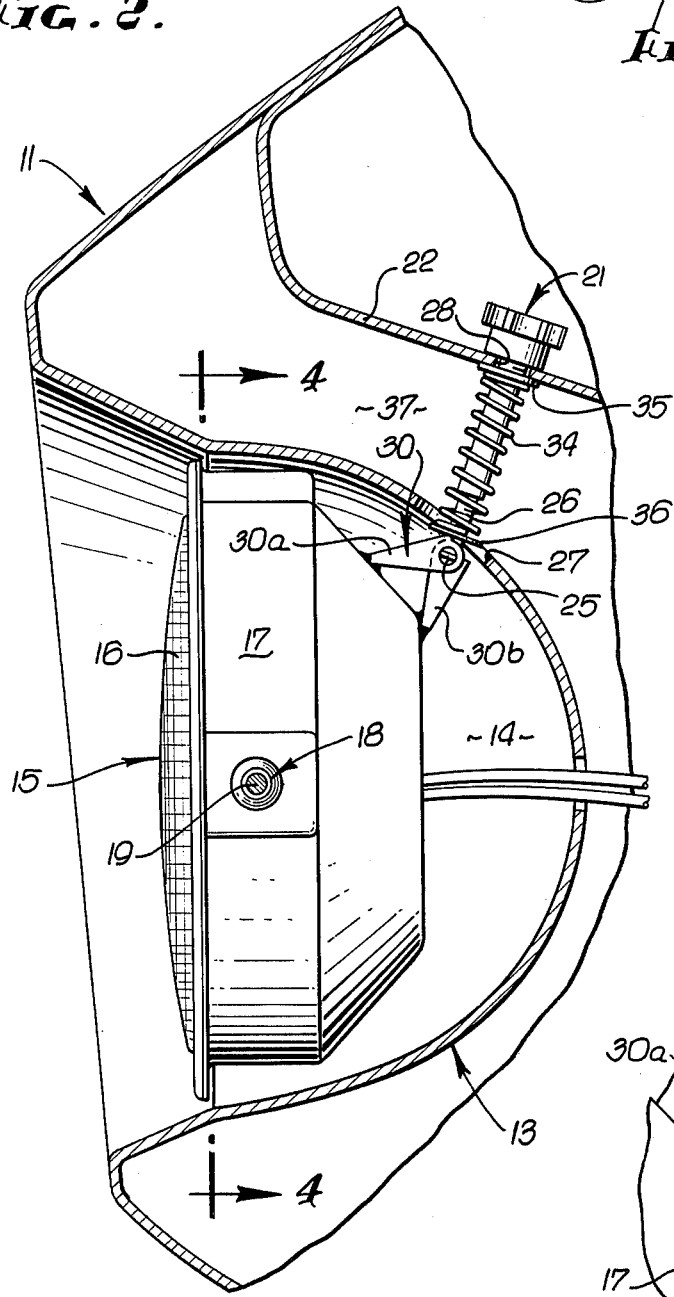

FIG. 1 shows a motorcycle 10 having a front fairing, or wind deflector 11, typically attached to the frame 12 and separate from the handle bar 12a. As shown in FIGS. 2 and 4, the fairing includes a re-entrant shell portion 13 forming a well or recess 14 in which a headlight 15 is received. The headlight includes a front lens 16 carried by a casing 17, the latter being mounted on support means such as horizontal trunnions 18 so as to be tiltable about horizontal axis 19. The trunnions may for example take the form of fasteners shown in FIG. 4 as having heads 18a at the inner sides of casing flanges 17a and 17b, shanks 18b passing through openings 20a in the fairing shell portion 13, and nuts and washers 20 and 20b on the threaded shanks at the outer sides of the flanges. Tilting of the headlight about axis 19 tilts the light beam up or down, and it is an object of the invention to control such tilting so that the beam may be properly directed forwardly but toward the pavement, for different weight users or operators of the motorcycle, as for repositioning for normal loads.

For this purpose, a manual control is located on the fairing, and other means is connected with or between the headlight structure and the manual control to controllably tilt the headlight in response to manual operation of the control. As shown in FIG. 2, the manual control may advantageously take the form of a knob 21 located on the upper side of a shelf 22 formed by the fairing and spaced above the re-entrant portion 13.

The other means connecting the knob to the casing may with unusual advantage include a first part operatively connected to the casing in rearwardly and upwardly offset relation to horizontal axis 19, and a second and elongated part connected to the knob or manual control, the two parts having threaded interengagement characterized in that rotation of the second part by the knob displaces the first part relatively up or down, to tilt the headlight. For example, in FIGS. 2, 3 and 7 the first part comprises a nut 24 having laterally oppositely projecting trunnions 25, located within the space 14 defined by the re-entrant portion 13 of the fairing. The second part shown at 26 is elongated to pass through an opening 27 in the re-entrant portion of the casing, and also through an opening 28 in the shelf 22. Part 26 at its upper end is integral with the knob and at its lower end is threaded for threaded interengagement with the nut; therefore, as the knob is rotated, the nut moves toward or away from the knob, to tilt the headlight about lateral axis 19.

Additional connection structure is defined by a bracket 30 having upper and lower legs 30a and 30b welded to the upper rear portion of the casing 17. The ends of the legs furthest from the casing are overlapped and form two pairs of laterally registered openings 31 and 32 at opposite sides of the nut, to receive the trunnions 25.

The use of two bracket legs 30a and 30b facilitates ease of operative connection of the trunnions to the casing 17, without jamming of the tilt adjustment means, for different relative positions or alignments of the casing 17 and openings 27 and 28, which may occur in production and installation. Note that the elongated part is axially aligned with the rearward portion of the casing 17, i.e. to the rear of axis 19.

Also provided in a compression spring 34 which extends about the second part 26 and urges the casing in a direction tending to tilt the beam upwardly. The upper end of the spring bears against a bearing or washer 35 pushing against the underside of the shelf, whereas the lower end of the spring pushes against bearing or washer 36 which bears against the uppermost edges of one or both bracket arms 30a and 30b; also, washer 36 may tilt relative to part 26 to accommodate to shifting axial alignment of the stem or part 26 as the nut travels up and down during adjustment. The spring and part 26 co-act to cause the trunnions to frictionally and forcibly engage the bores or walls of openings 31 and 32, tending to hold the casing 17 in selected tilt position. For this purpose, the trunnions may have lateral edges which bite against such bores or walls. FIG. 8 shows a trunnion polygonal cross section, with gripping edges 25a–25d. Note also that the part 26 includes a cylindrical section 26b, about which the spring 34 extends, in space 37 intermediate shelf 22 and sheet 13. A set screw 38 retains the upper end 26c of the part 26 to the knob.

Figure 7:
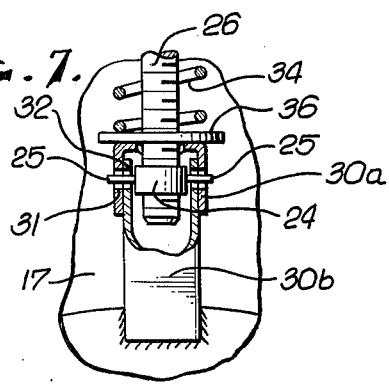
Figure 3:
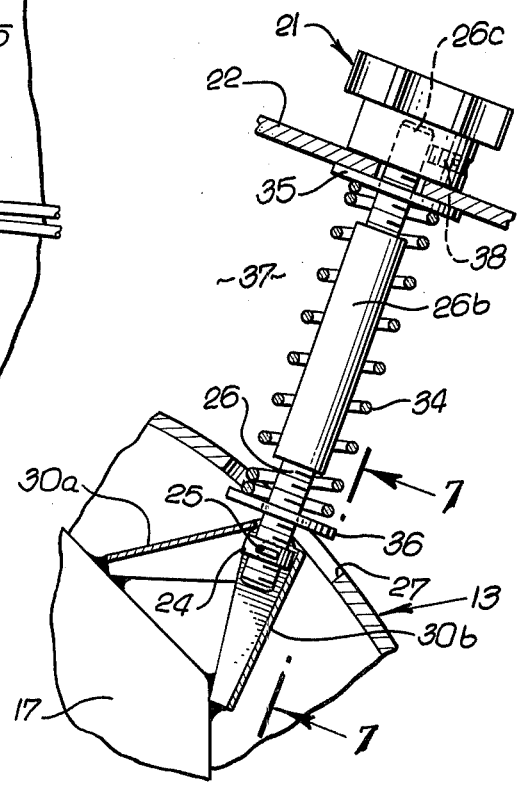

Turning now to FIG. 5, elements thereof which corresponds to those in FIGS. 2, 3 and 7 bear the same identifying numerals, preceded by a "1". Spring 34 is omitted, and instead, a tension spring 150 is connected between the fairing re-entrant portion 113, at location 113a, and the casing 117, at underside location 117a forward of location 113a. Thus, the spring is in the space 114 and elongated in a direction extending part way about axis 119, i.e. as designated by angle α. The spring therefore urges the casing in a counterclockwise direction about axis 119. At the same time, the second part 126 resists rotation of the casing 117 by the spring. In this regard, washer 140 is loosely confined between the upper end of enlargement 126b and the underside of shelf 122 to block upward travel of part 26.

In FIG. 6, elements thereof which correspond to those in FIGS. 2, 3 and 7 bear the same identifying numerals, preceded by a "2". Again, spring 34 is omitted and instead, a tension spring 251 is connected between fairing re-entrant portion 213 at location 213a, and the casing 217 at underside location 217b rearwardly of location 213a, thus the spring 251 is in the space 214 and elongated in a direction extending part way about axis 219, i.e. as designated by angle β. The spring therefore urges the casing in a clockwise direction about axis 219. At the same time, the second part 226 resists rotation of the casing 217 by the spring. Note in this regard that the knob 221 bears against the top of shelf 222 to prevent travel of the part 226 downwardly.

I claim:
1. In combination with motorcycle headlight structure and wind deflecting fairing,
 (a) support means supporting the headlight structure to the fairing so that the headlight is tiltable to tilt the headlight forward beam up and down, said structure including a lamp casing,
 (b) a manual control on the fairing, and
 (c) other means connected with the headlight structure and the manual control to controllably tilt the headlight in response to manual operation of said control,
 (d) there being a spring acting to transmit force biasing said headlight structure in a tilt direction,
 (e) said other means including interconnection structure including first and second parts that are interconnected so that rotation of the manual control displaces said parts to tilt the headlight as aforesaid,
 (f) the fairing including a re-entrant portion receiving the headlight structure, and a shelf spaced above the level of said re-entrant portion, said manual control located above said shelf, there being openings in the shelf and re-entrant portion of the fairing to receive said interconnection structure,
 (g) said other means including multi-legged brackets integral with the casing and supporting said first part to swivel about a lateral axis as the headlight is tilted, there being trunnion means on said first part and received in at least one bracket carried opening, the trunnion means having an edge to frictionally engage a bore defining said opening in response to force exertion by the spring, thereby to hold the casing in selected tilt position.

2. The combination of claim 1 wherein said first part is connected to the casing in offset relation to said axis, and said second part is elongated and connected to the manual control, said parts having threaded interengagement characterized in that rotation of said second part by said manual control displaces said first part relatively up and down.

3. The combination of claim 2 wherein said spring comprises a compression spring about said second part and urging said casing about said axis in a direction tending to tilt the beam upwardly, said second part resisting displacement of the casing by the spring.

4. The combination of claim 2 wherein said spring comprises a tension spring connected between the fairing and said casing and urging the casing in one direction about said axis, said second part resisting displacement of the casing by the spring.

5. The combination of claim 2 wherein said shelf is above the re-entrant portion, and said manual control comprises a knob directly over said shelf, said second part operatively connected to the knob and projecting through said opening in said re-entrant portion of the fairing, said first part located within said re-entrant portion of the fairing.

6. The combination of claim 5 wherein said second part also passes through said opening defined by the shelf.

7. The combination of claim 5 wherein said spring comprises a compression spring about the second part in the space between the shelf and said re-entrant portion of the fairing, said spring urging said casing about said axis in a direction tending to tilt the beam upwardly, said second part resisting displacement of the casing by the spring.

* * * * *